United States Patent [19]
Amr et al.

[11] Patent Number: 5,916,253
[45] Date of Patent: Jun. 29, 1999

[54] COMPACT TRAILER REFRIGERATION UNIT

[75] Inventors: Yehia M. Amr, Manlius; Mitchell F. Mattison, Central Square; Todd W. Wilson, North Syracuse, all of N.Y.

[73] Assignee: Carrier Corporation, Farmington, Conn.

[21] Appl. No.: 09/072,119

[22] Filed: May 4, 1998

[51] Int. Cl.[6] ................................................ F25D 3/06
[52] U.S. Cl. ..................... 62/259.1; 62/239; 62/323.1; 62/404; 62/426; 62/428
[58] Field of Search ................................ 62/239, 323.1, 62/404, 426, 428

[56] References Cited

U.S. PATENT DOCUMENTS 4,616,693 10/1986 Dietzsch et al. ........................... 165/41
5,609,037 3/1997 Fischler ..................................... 62/239

*Primary Examiner*—Henry Bennett
*Assistant Examiner*—Mark Shulman
*Attorney, Agent, or Firm*—Wall Marjama Bilinski & Burr

[57] ABSTRACT

A compact refrigeration unit for use in a trailer container that includes a support frame that is mounted upon the front wall of the container. A power package containing a diesel engine coupled to a generator and an electrically driven compressor are mounted in the lower section of the frame. Front and rear compartments are situated in the upper section of the frame. The front compartment contains a condenser heat exchanger and a pair of fan units are mounted in the bottom of the front compartment for directing condenser cooling air over the power package and the compressor. An evaporator heat exchanger is mounted in the rear compartment along with a pair of fan units mounted in the top of the compartment. The evaporator heat exchanger and the associated fan units communicate with the container to circulate conditioned air through the container.

14 Claims, 7 Drawing Sheets

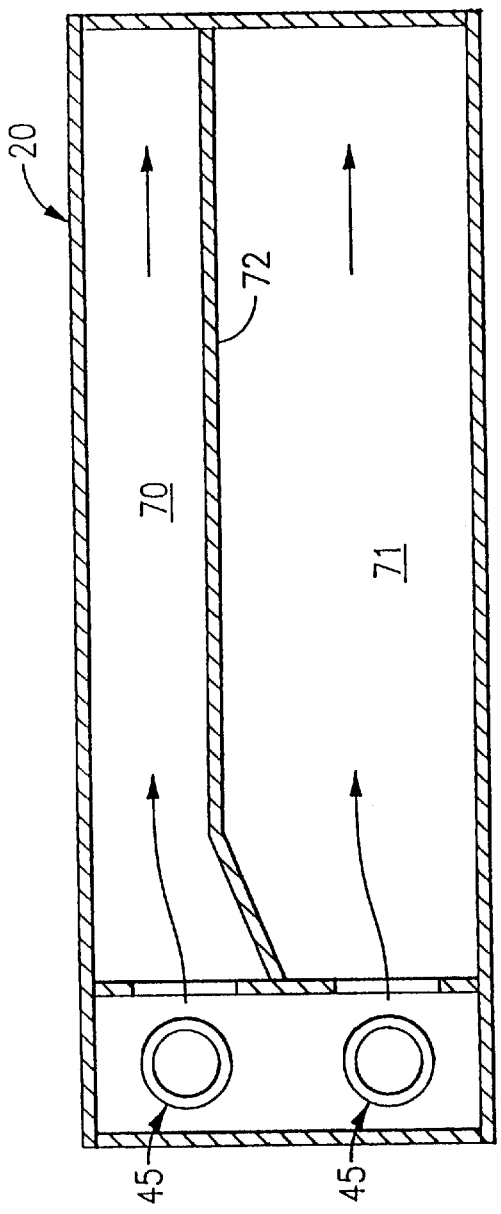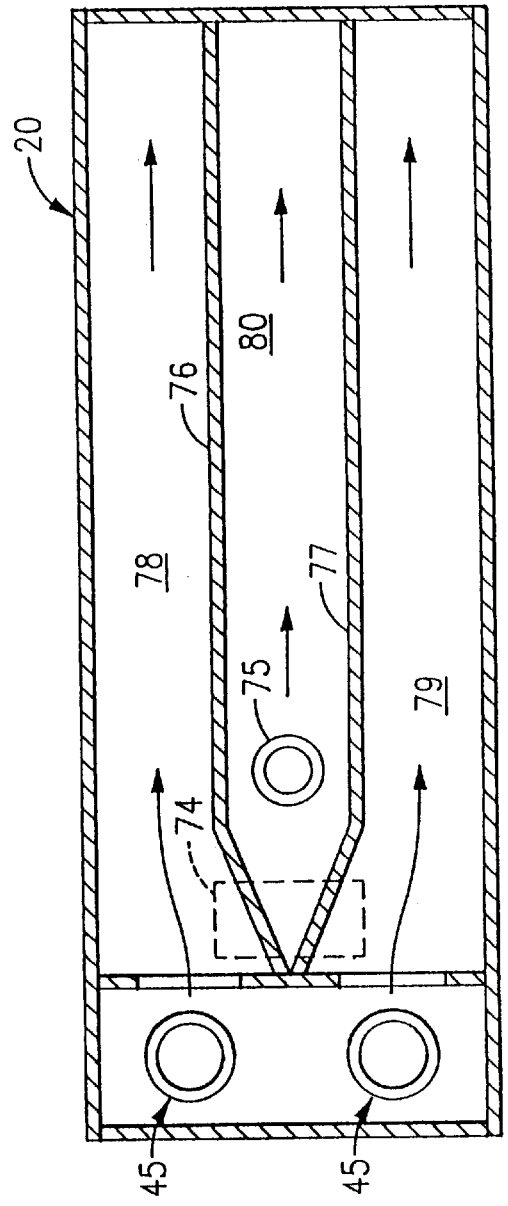

COMPACT TRAILER REFRIGERATION UNIT

BACKGROUND OF THE INVENTION

This invention relates to a transport refrigeration system and, in particular, to an all electric compact trailer refrigeration unit that receives its electrical power from a single on board diesel engine and electric generator combination.

Trailer refrigeration units are known in the art utilizing electrically regulated power sources necessary to operate on board electrical components. Typically, such units include small generators that are well suited to powering a limited group of devices. However, these conventional refrigeration units are not capable of producing sufficient power to simultaneously operate all of the unit components requiring a power input. Such units require engine driven compressors in combination with a generator to produce the power, or alternatively some other type of auxiliary power. These prior art units also rely upon mechanical connections between the prime mover and the driven components. Also, the compressor shaft is directly coupled to the prime mover and thereby necessitates complex shaft seals to prevent refrigerant from leaking from the compressor. These mechanical couplings and complex seals are not only costly, but are difficult to install and maintain.

There still exists a need in the art for a truly compact, lightweight trailer refrigeration unit that does not have the problems associated with mechanical belts, pulleys, clutches and the like, and which is capable of delivering a high airflow rate and a high rate of heat rejection needed to meet the demands of present day cargo containers and trailers.

SUMMARY OF THE INVENTION

It is therefore an object of the present invention to improve refrigeration units and, in particular, refrigeration units employed in association with trailer cargo containers.

It is a further object of the present invention to provide an extremely lightweight, compact trailer refrigeration unit having a high rate of airflow through the unit and a reduced level of noise.

A still further object of the present invention is to provide a compact trailer refrigeration unit having enlarged heat exchanger surfaces for providing a high rate of heat rejection and improve the ability to cool under high ambient temperatures.

Another object of the present invention is to provide a trailer refrigeration unit wherein the condenser fan, the evaporator fan and the compressor are all powered by an electrical generator driven by a prime mover such as a diesel engine.

Yet another object of the present invention is to eliminate the need for mechanical coupling between the prime mover of a trailer refrigeration unit and the power driven components of the unit.

Still another object of the present invention is to utilize multiple fans in association with the heat exchangers of a trailer refrigeration system to increase the airflow through the system while at the same time conserving space and increasing the amount of heat rejected by the heat exchangers.

Yet a further object of the present invention is to utilize the airflow passing through the condenser unit of a trailer refrigeration system to provide cooling to the prime mover and the compressor of the unit.

A still further object of the present invention is to utilize multiple fans for servicing the evaporator heat exchanger of a trailer refrigeration unit which allow for the use of a larger heat exchanger surface area and which further enhance the distribution of conditioned air throughout the trailer cargo container.

These and other objects of the present invention are attained by means of a trailer refrigeration unit that includes a support frame that is mountable upon the front wall of a trailer cargo container. The frame has an upper section and a lower section. A prime mover such as a diesel engine is housed in the lower section of the frame and is connected in combination with electrical generators to form a power package. An electrically powered compressor is also mounted in the lower section of the frame and is driven by power supplied by the generator. The upper section of the support frame contains a front compartment and a rear compartment that are separated by a common wall. A condenser heat exchanger is mounted in the front compartment of the upper section of the frame and an evaporator heat exchanger is mounted in the rear compartment behind the condenser heat exchanger. A pair of electrically driven vane axial fans are mounted in the bottom of the front compartment within an air passage located behind the condenser heat exchanger. The condenser fans are arranged to draw a high volume of air through the condenser heat exchanger and pass air over both the power package and the compressor situated below the fans in the lower section of the frame. A pair of centrifugal fans are mounted in the top of the rear compartment and are arranged to draw return air from the cargo container through the evaporator heat exchanger and return conditioned supply air to the cargo container. The evaporator fans are arranged to turn in opposite directions to conduct conditioned supply air along the center of the cargo container along the ceiling to cool both the walls of the container and the cargo before being returned to the inlet of the evaporator heat exchanger. An evaporator air passage is situated behind the evaporator heat exchanger and is separated from the condenser air passage by the common wall. The commonly shared wall is inclined with regard to the vertical centerline of the frame so that the flow passages behind each heat exchanger diverges in the direction of air flow.

BRIEF DESCRIPTION OF THE DRAWINGS

For a better understanding of these and other objects of the present invention, reference will be made to the following detailed description of the invention which is to be read in association with the accompanying drawings, wherein:

FIG. 7a and FIG. 7b are schematic top views of a cargo container employing different cargo compartment configurations that are compatible with various evaporator fan arrangements.

DESCRIPTION OF THE INVENTION

Figure 1:
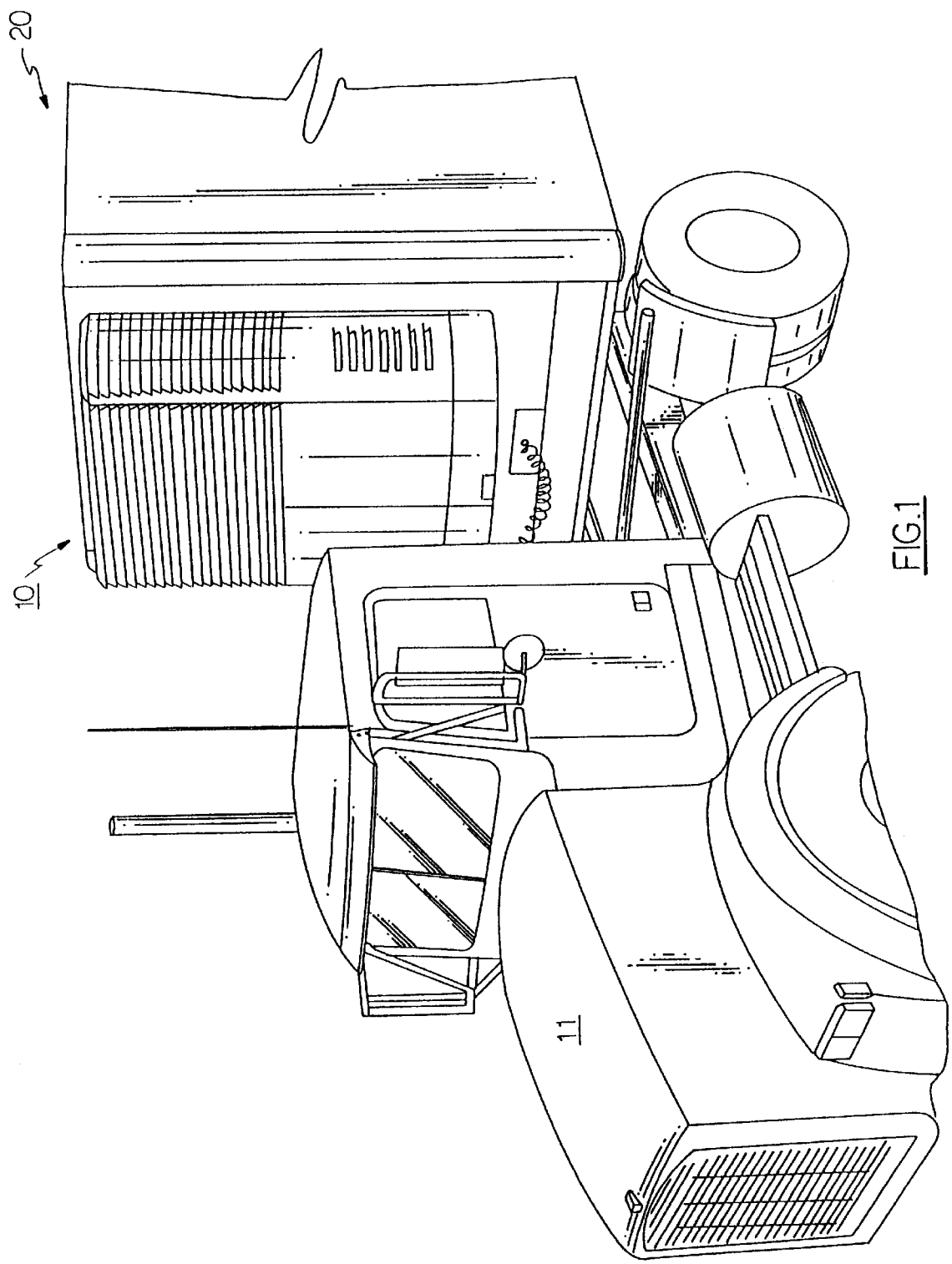
FIG. 1 is a partial view in perspective showing a truck trailer combination equipped with a refrigeration unit embodying the teachings of the present invention.
Figure 2:
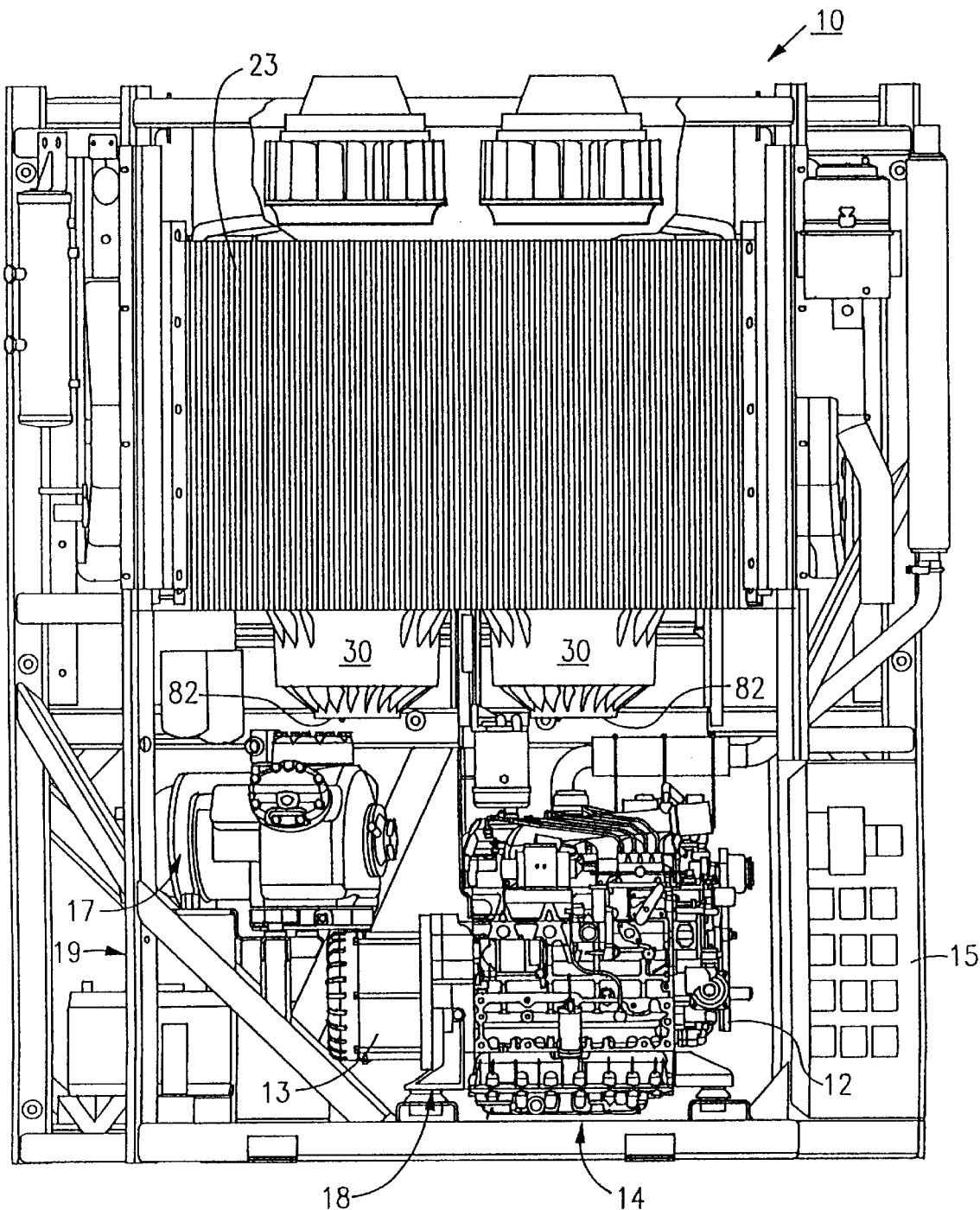
FIG. 2 is a front elevation of the present refrigeration unit with the cover panels removed.

Referring initially to FIGS. 1 and 2, there is illustrated a tractor trailer 11 containing a refrigeration unit, generally referenced 10, that embodies the teachings of the present invention wherein the refrigeration unit derives its electrical power solely from a diesel engine 12 that is integrally joined with a permanent magnet generator 13 to form what herein will be referred to as a power package 14. This package results in a truck trailer refrigeration unit that is extremely compact and devoid of constraints imposed by conventional belt drives, shafts and other types of mechanical linkages. The permanent magnet generator 13 can be either a synchronous or non-synchronous type and the refrigeration unit electronic controls can be customized to provide a match between the generator output and refrigeration unit components powered thereby. An electrical control box 15 furnishes a compact singular interface between the various electrically driven components coupled to the power package. The truck trailer refrigeration unit 10 further includes a compressor 17 mounted above and to one side of the diesel engine and generator power package within a mounting bracket 18 which is driven electrically from power provided by the generator 13. The mounting bracket 18 forms part of the main support frame 19 of the refrigeration unit which is secured to the front wall of the cargo container 20.

The mounting bracket 18 is located in the lower section of the support frame 19. The upper section of the support frame contains back to back compartments 21 and 22 (FIG. 3) that are separated by a wall 23. The front compartment 21 houses the condenser heat exchanger 24 of the refrigeration unit while the rear compartment 22 houses the unit's evaporator heat exchanger 25. A condenser air passage 26 is provided behind the condenser heat exchanger in the front compartment and an evaporator air passage 27 is provided behind the evaporator heat exchanger in the rear compartment. The two back-to-back air passages are separated by the common wall 23. As is conventional in the art, the condenser is connected to the discharge port of the refrigerant compressor and the evaporator is similarly connected to the suction port of the compressor. The two heat exchangers are, in turn, connected together by a refrigerant line 28 (FIG. 3) containing an expansion device 29 to complete the refrigeration circuit.

The condenser heat exchanger contains an enlarged surface area 23 (FIG. 2) which faces the front of the truck. The large surface area serves to minimize the pressure drop over the condenser and allow for a high rate of airflow through the unit.

Figure 3:
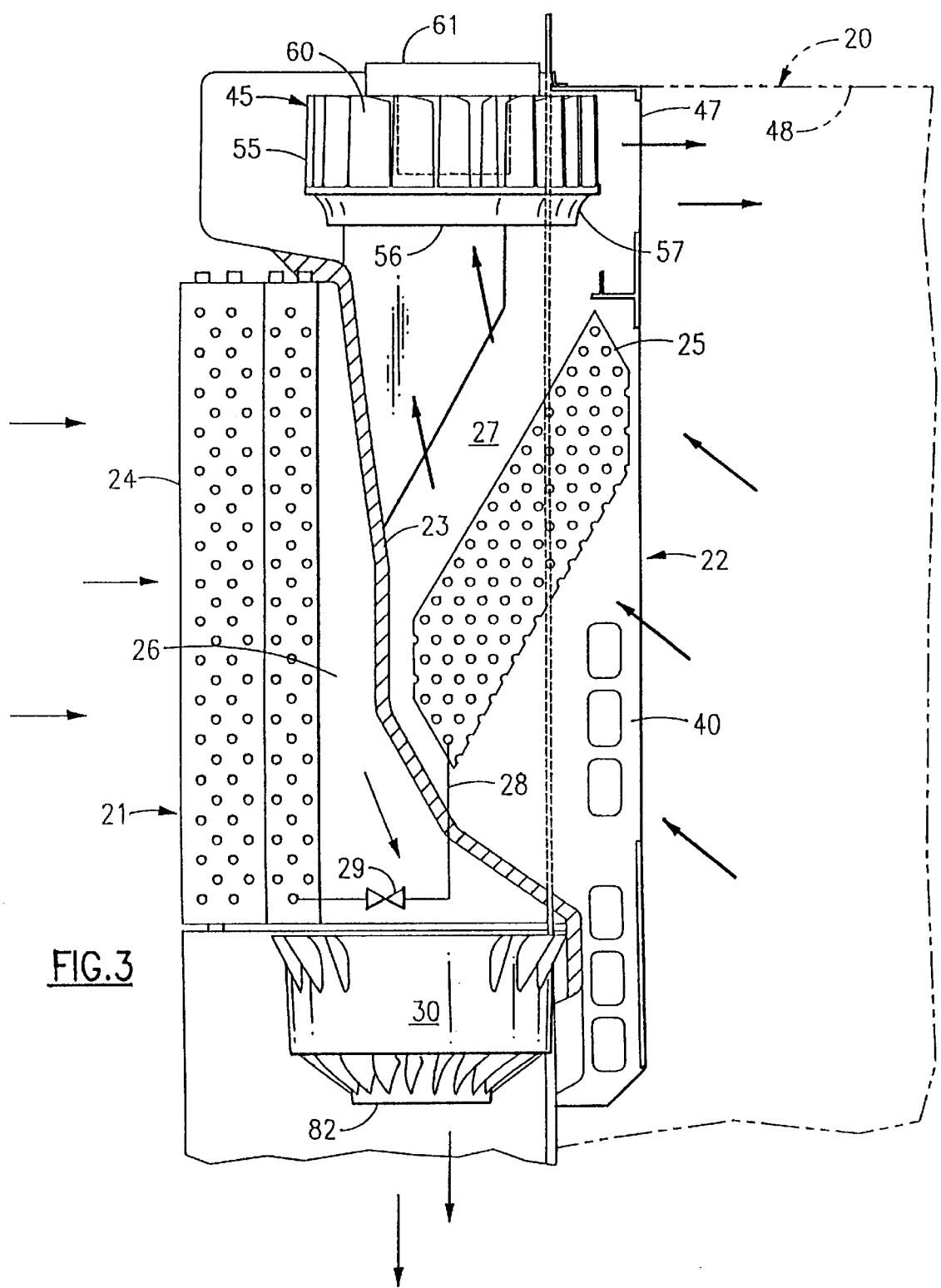
FIG. 3 is a partial side elevation of the refrigeration unit showing the upper section of the support frame.
Figure 4:
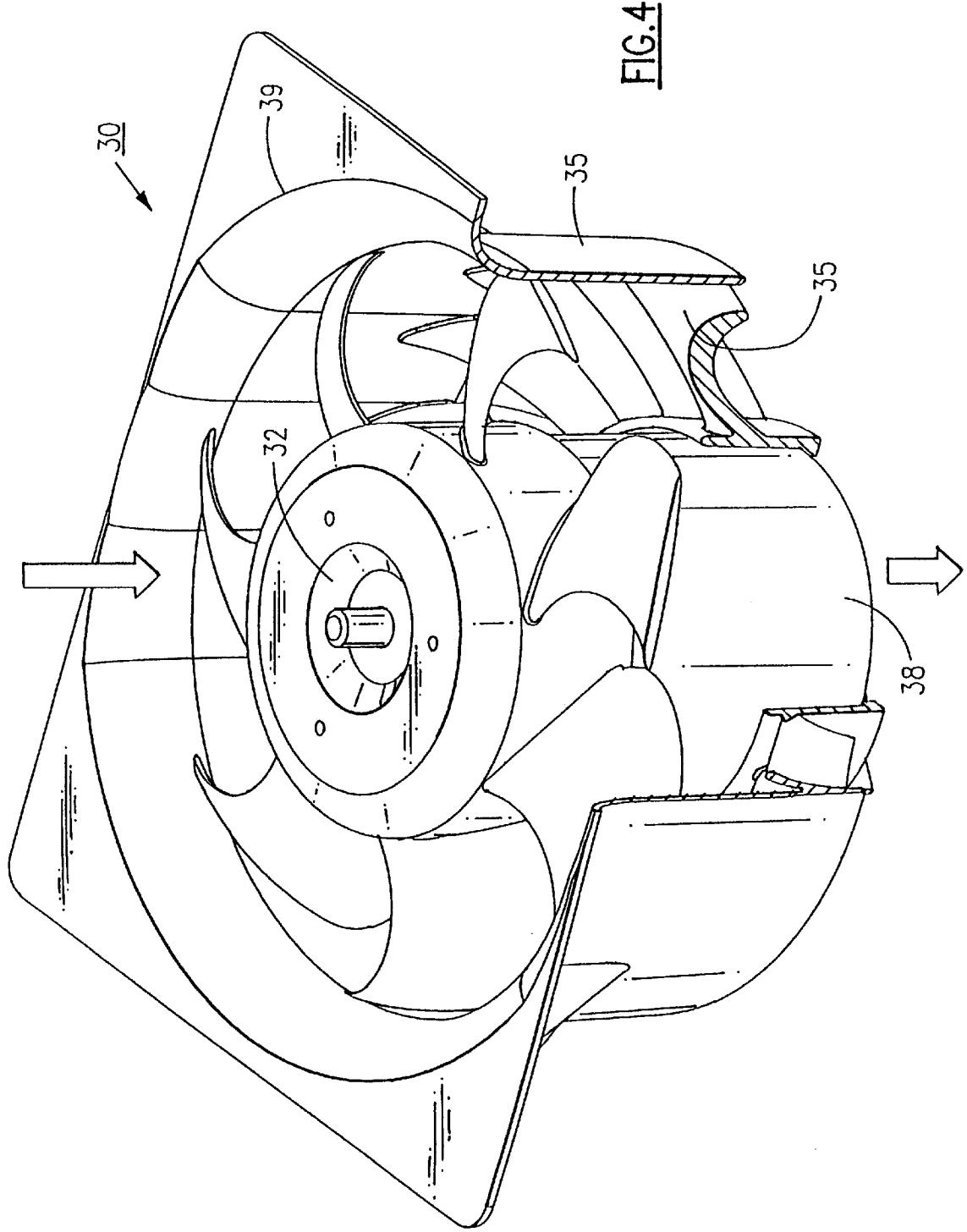
FIG. 4 is an enlarged perspective view of one of the condenser fan units utilized in the refrigeration unit.

As best illustrated in FIGS. 2–4, a pair of electrically driven vane axial fan units 30 are mounted in the bottom wall of the front compartment 21 and are arranged to draw ambient air through the condenser heat exchanger as indicated by the arrows in FIG. 3. As noted above, the fan units are driven electrically by power provided by the generator 13. The condenser air passage 26 diverges in the direction of air flow from the top of the front compartment toward the bottom of the compartment. The passage and dual fan units are designed to accommodate a high rate of airflow through the condenser under high static loading. An electrical motor 32 is supported upon the stator blades 33 of each fan unit and the stator blades, in turn, are secured to the fan housing 35. The distance between the rotor blades 36 of each fan unit and the stator blades is more than one blade chord length. The rotor preferably contains between five and eleven blades each having a skewed geometry such that the tip sweep of each blade is between 50° and 70°. The stator preferably contains between eleven and twenty three blades that are skewed in a direction that is opposite to that of the rotor blades and having a sweep angle at the tip of each blade of between 20° and 50°. The rotor blades thus pass the stator blades at about 90° thus minimizing the interaction between the rotor and the stator and reducing the amount of noise produced by the fan.

The motor of each condenser fan, which as noted above, is supported on the stator blades and is largely contained within the hub 38 of the fan unit. The inlet bell 39 (FIG. 4) of each fan unit has an elliptical shape with its major axis being about 0.05 to 0.15 times the rotor diameter and its minor axis being about 0.03 to 0.10 times the rotor diameter. This construction further reduces the low noise level of the fan while considerably reducing the size of the units without sacrificing the rate of airflow through the condenser.

Although the condenser fans utilized in the practice of the present invention are preferably vane axial units, centrifugal fan units may also be similarly employed. Again, the centrifugal units are mounted in the upper compartment and arranged to pass cooling air over the compressor and the motor-generator power package. Alternatively, the centrifugal units can be arranged to discharge the condenser air out of the sides of the refrigeration unit.

It should be noted that the evaporator fans and the condenser fans each rotate in a horizontal plane and are placed above and below the evaporator and condenser heat exchangers. Accordingly, the fans do not block the air passages through the heat exchanger coils allowing a fall volume of air to pass over the exchanger surfaces.

Figure 5:
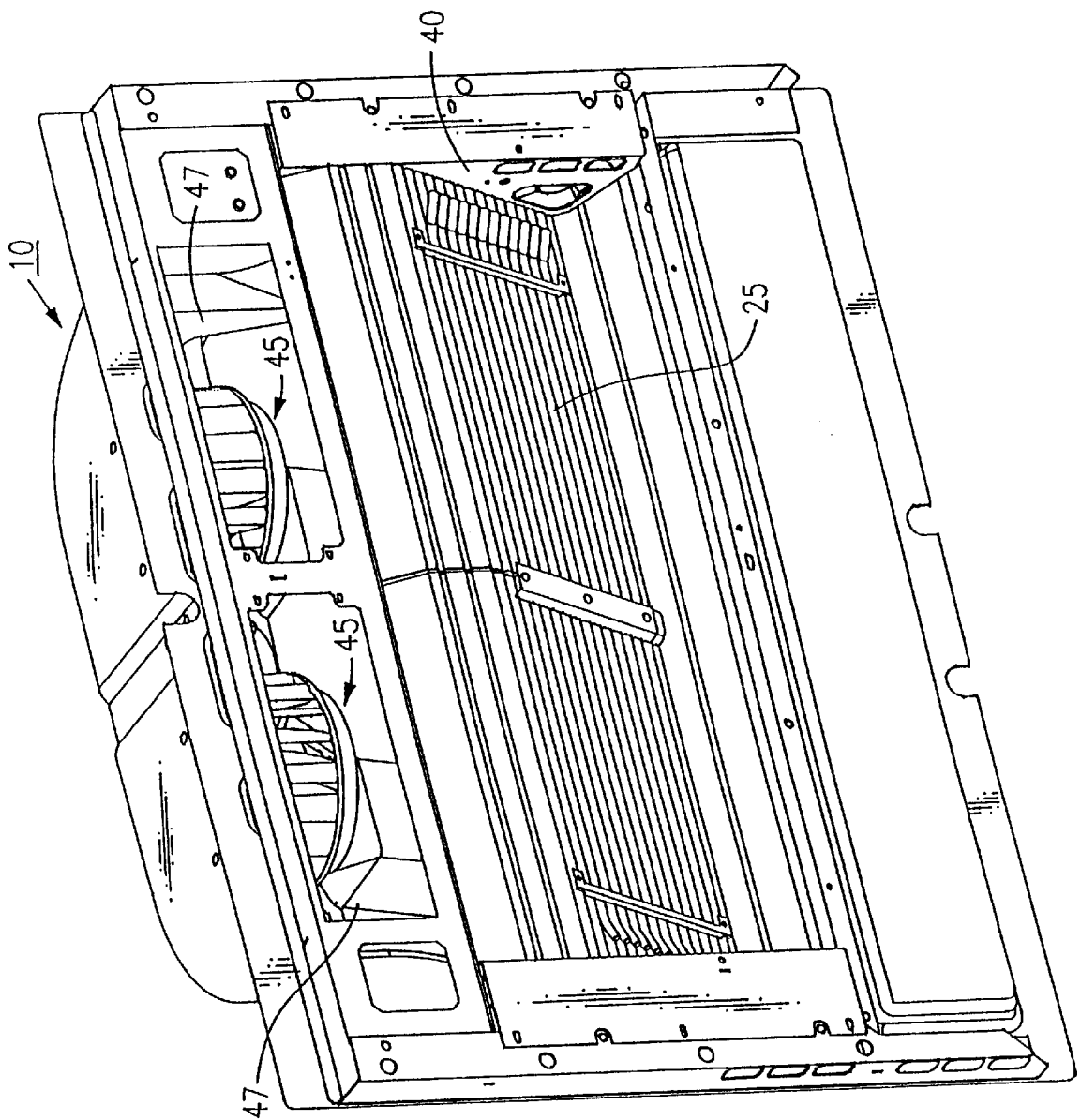
FIG. 5 is a perspective view showing the rear wall of the upper section of the refrigeration unit.

With further reference to FIGS. 3 and 5, the rear compartment 21 of the support frame contains a large rectangular shaped opening 40 that enters the back of the cargo container 20. The evaporator heat exchanger 25 is situated behind the opening and is placed at an incline with respect to the vertical center line of the refrigeration unit. This, in turn, allows for the use of a heat exchanger having an expanded surface area without the need for additional space. A pair of high performance, electrically driven centrifugal fan units 45 which are driven electrically by power from generator 13 are mounted in the top part of the rear compartment and are arranged to draw a high volume of air from the cargo container through the evaporator heat exchanger. The conditioned air, after passing through the heat exchanger, is conducted through the evaporator air passage 27, turned 90° in the fan units and returned to the cargo container through two exit openings 47 provided in the top of the container's front wall. The top openings in the container are located just below the container ceiling 48 (FIG. 3) so that conditioned supply air is directed along the ceiling toward the back of the container. The centrifugal fans are arranged to turn in opposite directions to further direct the supply airflow toward the center of the container. This, in turn, causes the conditioned supply to become well distributed over the walls of the container as well as the cargo to provide for highly efficient uniform temperature distribution throughout the container.

Figure 6:
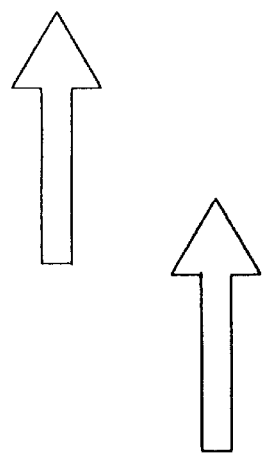
FIG. 6 is an enlarged view in perspective showing one of the evaporator fan units utilized in the refrigeration unit.
Figure 6:
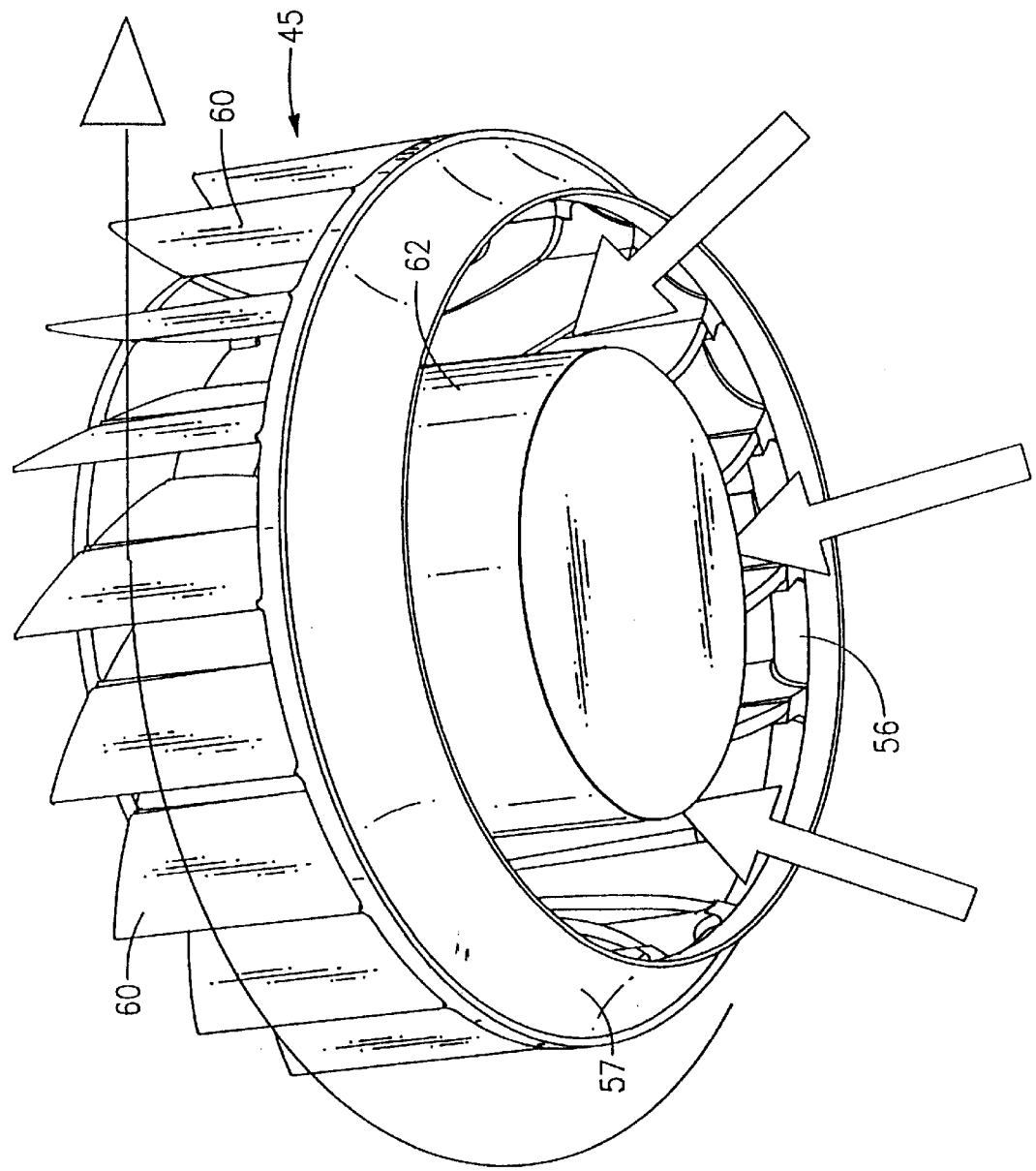

The motor base 61 of each evaporator fan unit passes through the roof of the rear compartment and is secured to the unit support frame. The fan impeller 55 is attached to the motor housing 62 (FIG. 6). In prior art, centrifugal fan units of this type, the motor generally blocks a significant amount of air at the inlet to the impeller. This results in an unwanted, generally, relatively large, pressure drop at the entrance to the fan forcing the fan to do additional work to overcome entrance losses. Entrance losses are considerably reduced in the present centrifugal units by providing each unit with a large rotating shroud 57 having a correspondingly large inlet orifice 56. The shroud and the orifice each has an elliptical shape which serves to more efficiently conduct air through the impeller with a minimal amount of flow separation. The leading edge of each impeller blade 60 also is famished with an elliptical shape enabling the blades to quickly fill the gap between the motor housing 62 and the inlet orifice with the air resulting in improved performance at high static pressures.

The cargo container, as illustrated in FIGS. 7a and 7b may be partitioned into separate zones by walls with one of the centrifugal fan units being arranged to service each of the zones. In this way, the temperature in each zone can be controlled by independently regulating the activity of each evaporator fan unit. As illustrated in FIG. 7a, the cargo container may be divided into two distinct zones 70 and 71 by means of a partition 72. Conditioned supply air to each zone is provided by one of the two evaporator fan units 45. Similarly, as illustrated in FIG. 7b, the present refrigeration unit may be altered to include a small auxiliary evaporator heat exchanger 74 having short refrigeration and condensate drain lines that are connected into the main unit and a separate small electrically driven centrifugal fan unit 75. In this case, the cargo container is divided into three zones by two partitions 76 and 77. These zones included two other zones 78 and 79 of substantially equal volume and an interior zone 80 of relatively less volume. The two outer zones in this case are serviced by fan units 45 and the interior zone is serviced by fan unit 75.

Returning once again to FIG. 2, the condenser fan units 30 that are mounted in the front compartment of the upper section of the support frame each contain an exit diffuser 82. The diffuser of the left hand fan unit, as viewed in FIG. 2, is arranged to direct the exhaust air from the fan unit over the compressor 17. Similarly, the exit diffuser of the right hand fan unit is arranged to direct exhaust air over the power package 14. Although the exhaust air from the fan units is relatively warm, it is well below the operating temperature of the compressor and the power package. As a consequence, the exhaust air provides additional cooling for the refrigeration unit components housed in the lower section of the main support frame prior to being discharged to ambient.

As should be evident from the disclosure above, the present refrigeration unit represents a very compact system that is ideally suited for use in servicing a truck trailer application. Beyond being compact, the present unit is entirely electrically driven, thus eliminating noisy and oftentimes troublesome mechanical drives such as belts, gears, and the like. The multiple condenser and evaporator fans provide for a wide flexibility in design and enhance the overall performance of the unit. The high airflow furnished by the fans and the large heat exchanger surface area further results in a high rate of heat rejection while at the same time conserving space, energy and fuel.

While this invention has been explained with reference to the structure disclosed herein, it is not confined to the details set forth and this invention is intended to cover any modifications and changes as may come within the scope of the following claims:

What is claimed is:

1. A refrigeration unit suitable for use in a trailer cargo container that includes
   a support frame mounted upon a front wall of a cargo container, said support frame having an upper section containing a front compartment and a rear compartment, and a lower section located beneath the upper section,
   a prime mover that is coupled to an electrical generator to form a power package, said power package being mounted in the lower section of the frame along with an electrically driven refrigeration compressor,
   a condenser heat exchanger mounted in the front compartment of the support frame that is connected to the discharge side of the compressor,
   at least one evaporator heat exchanger mounted in the rear compartment of said support frame that is connected to the suction side of said compressor,
   a refrigerant line containing an expansion device connecting the heat exchanger,
   at least one electrically driven condenser fan mounted in the bottom of the front compartment for drawing ambient air through the condenser heat exchanger and discharging said air into said lower compartment,
   at least one electrically driven evaporator fan mounted in the top of said rear compartment and being arranged to draw return air from the container through the evaporator heat exchanger and discharging conditioned supply air back into the container and
   said refrigeration compressor, said at least one condenser fan and said at least one evaporator fan being electrically connected to said generator.

2. The refrigeration unit of claim 1 wherein the said at least one condenser fan is a vane axial unit containing stator and rotor blades arranged to discharge air axially through said unit into the lower compartment.

3. The refrigeration unit of claim 2 wherein said at least one evaporator fan contains an impeller for turning conditioned air about 90° and discharging the conditioned air along a top wall of the container.

4. The refrigeration unit of claim 2 wherein said condenser fan unit contains a diffuser at the discharge side of the unit.

5. The refrigeration unit of claim 2 containing a pair of condenser fan units arranged to direct discharged air over the power package and the compressor mounted in the lower section of the support frame.

6. The refrigeration unit of claim 3 containing a pair of evaporator fan units, wherein impellers contained in the evaporator fan units are arranged to turn in opposite directions.

7. The refrigeration unit of claim 1 that further includes an auxiliary evaporator heat exchanger connected into the refrigeration unit and a third electrically driven evaporator fan unit associated with said auxiliary evaporator heat exchanger, and further including partition means within the cargo container for dividing the container into three zones so that each zone is serviced by one of said evaporator fan units.

8. The refrigeration unit of claim 1 that further includes a baffle separating the front and rear compartment, said baffle being inclined to form an airflow path behind each heat exchanger that diverges in the direction of airflow.

9. A refrigeration unit for use in a cargo container that includes:
   a support frame attached to a front wall of a cargo container, said support frame containing an upper section having a forward compartment and a rear compartment and a lower section located below the upper section,
   a prime mover coupled integrally to an electrically driven generator to form a power package which is mounted in the lower section of the frame,
   an electrically driven refrigeration compressor mounted in the lower section that is electrically coupled to said generator, a condenser heat exchanger mounted in said forward compartment, an evaporator heat exchanger mounted in the rear compartment, a wall separating the front and rear compartments which defines a vertical passage behind each heat exchanger to form a condenser air passage and an evaporator air passage, a pair of electrically driven condenser fan units mounted in the bottom of the condenser air passage for drawing ambient air through the condenser heat exchanger and discharging said air into the lower section in heat transfer relation with said power package and said refrigerant compressor, a pair of electrically driven evaporator fans mounted in the top of the evaporator air passage for drawing return air from the container through the evaporator heat exchanger and turning the conditioned air flow about 90° and discharge the condition air along a top wall of the container, and means to electrically couple the condenser fan units and the evaporator fan units to said generator.

10. The refrigeration unit of claim 9 wherein said evaporator fan units contain impellers that are arranged to rotate in opposite directions.

11. The refrigeration unit of claim 9 wherein the condenser fan units are arranged to pass discharge air over the power package and refrigeration compressor to provide cooling to said power package and compressor.

12. The refrigeration unit of claim 9 wherein said condenser fan units are vane axial fans.

13. The refrigeration unit of claim 9 wherein said evaporator fan units are centrifugal fans.

14. The refrigeration unit of claim 9 wherein said wall is inclined to form an airflow path behind each heat exchanger that diverges in the direction of air flow.

* * * * *